United States Patent [19]
Anderson et al.

[11] Patent Number: 5,212,874
[45] Date of Patent: * May 25, 1993

[54] THREE-DIMENSIONAL DRAWING DEVICE

[76] Inventors: Richard H. Anderson; Robert R. Anderson, both of P.O. Box 1059, Trabuco Canyon, Calif. 92678

[*] Notice: The portion of the term of this patent subsequent to Aug. 13, 2008 has been disclaimed.

[21] Appl. No.: 668,193

[22] Filed: Mar. 12, 1991

Related U.S. Application Data

[62] Division of Ser. No. 420,136, Oct. 11, 1989, Pat. No. 5,038,482.

[51] Int. Cl.$^5$ .............................................. B43L 13/00
[52] U.S. Cl. .................................. 33/21.2; 33/27.11; 33/18.1
[58] Field of Search .............. 33/21.1, 21.2, 27.11, 33/18.1; 434/287, 288, 289

[56] References Cited

U.S. PATENT DOCUMENTS

| | | | |
|---|---|---|---|
| 379,914 | 3/1888 | Story | 33/21.2 |
| 774,998 | 11/1904 | Willson . | |
| 1,458,762 | 6/1923 | Hartman . | |
| 3,055,113 | 9/1962 | Grandjean | 33/18 |
| 3,063,163 | 11/1962 | Dukes, Jr. | 35/46 |
| 3,100,353 | 8/1963 | Chamberlin | 35/46 |
| 3,466,034 | 9/1969 | Sargent | 273/1 |
| 3,760,505 | 9/1973 | Clark | 33/18 R |
| 4,135,303 | 1/1979 | Gresset | 33/18 R |
| 4,364,176 | 12/1982 | Cassagnes | 33/18.1 |
| 4,369,579 | 1/1983 | Mizoule | 33/1 M |
| 4,406,285 | 9/1983 | Villasenor et al. | 128/305 |
| 4,451,985 | 6/1984 | Pullman | 33/18 R |
| 4,550,503 | 11/1985 | Klawitter | 33/18 R |
| 4,559,705 | 12/1985 | Hodge et al. | 33/1 B |
| 4,801,266 | 1/1989 | Kinberg | 434/85 |
| 5,038,482 | 8/1991 | Anderson et al. | 33/21.2 |

FOREIGN PATENT DOCUMENTS 1240532 8/1960 France .

Primary Examiner—Harry N. Haroian
Attorney, Agent, or Firm—Stetina and Brunda

[57] ABSTRACT

A three-dimensional drawing device comprising a transparent hollow globe, a powder material disposed within the globe which adheres to the inner surface of the globe, a scribe disposed within the globe which can be used to draw upon the inner surface of the globe by scraping off the powder material, and controls for manipulating the scribe. The device can be used to form three-dimensional sketches and is primarily intended for use as a teaching aid and toy.

4 Claims, 1 Drawing Sheet

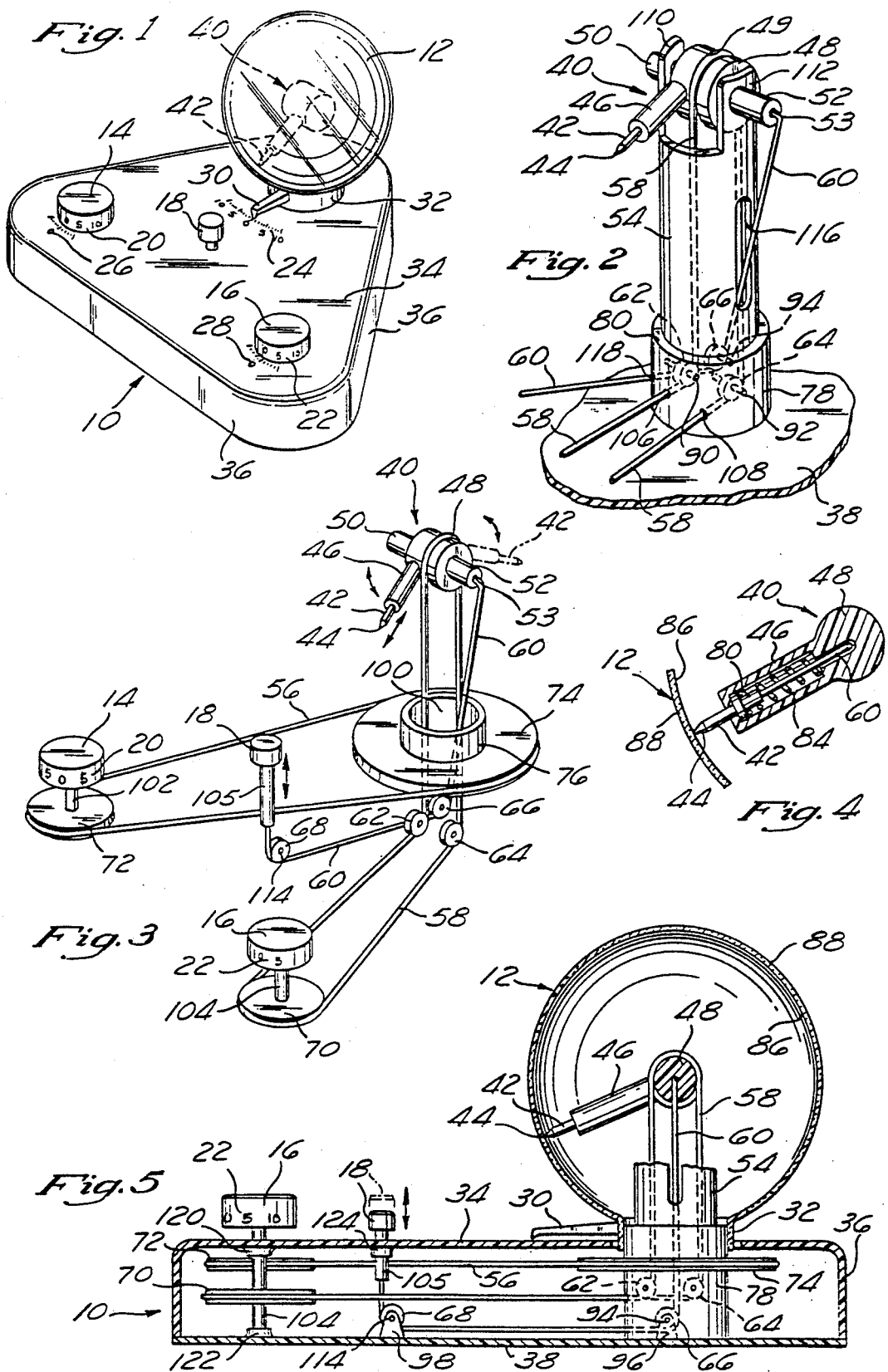

THREE-DIMENSIONAL DRAWING DEVICE

This application is a division of application Ser. No. 07/420,136, filed Oct. 11, 1989 now U.S. Pat. No. 5,038,482.

FIELD OF THE INVENTION

The present invention relates generally to toys, and more particularly to a three-dimensional drawing device comprising a transparent hollow globe, a powder material disposed within the globe which adheres to the inner surface of the globe, a scribe disposed within the globe which can be used to draw upon the inner surface of the globe by scraping off the powder material, and controls for manipulating the scribe. The device can be used to form three-dimensional sketches and is primarily intended for use as a teaching aid and toy.

BACKGROUND OF THE INVENTION

Two-dimensional drawing devices which provide a planar window upon which sketches may be formed by the manipulation of controls which position a scribe to remove a powder material from the lower or inner surface of the planar window are well known. One such device is the popular ETCH-A-SKETCH (a registered trademark of the Ohio Art Company).

A two-dimensional drawing device of the ETCH-A-SKETCH type is disclosed in U.S. Pat. No. 3,055,113 issued to Grandjean. This device uses a system of pulleys and cables to position a scribe along the lower surface of a transparent planar window. Two knobs control the cables and pulleys. Rotating one knob causes the scribe to move horizontally while rotating the other knob causes the scribe to move vertically. Therefore, various patterns and figures can be formed upon the planar window by manipulating the two knobs to move the scribe across the lower surface of the planar window. As the scribe moves across the lower surface of the planar window it scrapes the powder material away, thereby forming an image.

By inverting the two-dimensional drawing device and shaking it moderately, the sketch so formed can be erased. A quantity of powder material is disposed within the housing which acts as a reservoir for the powder material. The housing also provides structural support for the pulleys, cables, control knobs, and transparent planar window. Inverting the device causes the powder material, which normally rests upon the floor of the housing, to come into contact with the inner surface of the transparent planar window. Shaking the device moderately assures that the powder material will adhere to all areas of the planar window, particularly where the powder material has been removed by the scribe.

An obvious limitation of the two-dimensional drawing device is that it can only be used to form sketches upon a planar surface. This restricts the use of the two-dimensional drawing device to images that are well represented in two dimensions. As is well known, not all images can be suitably represented in two dimensions.

The surface of a globe, such as the earth's surface, cannot be represented adequately in two dimensions. Attempts to do so have resulted in maps such as the Mercator Projection in which the meridians or lines of longitude are drawn parallel to each other and the parallels or lines of latitude are drawn as straight lines whose distance from each other increases with their distance from the Equator. This, of course, results in a gross distortion of the true nature of the earth's surface, which can only be properly represented upon the surface of a sphere.

U.S. Pat. No. 4,364,176 issued to Cassagnes et al. discloses a drawing device which has a curved drawing surface. The drawing surface of the Cassagnes device is convex toward the user, providing an outward bulge much like the screen of a television set. While the screen of the Cassagnes device is not technically two dimensional, since it is not planar, it is limited to depicting much the same type of images. The screen of the Cassagnes device is essentially nothing more than a planar screen with a slight bulge in the center.

As such, although the prior art has recognized to a limited extent the problems of properly representing three-dimensional images, the proposed solutions have to date been ineffective in providing a satisfactory remedy.

SUMMARY OF THE INVENTION

The present invention specifically addresses and alleviates the above-mentioned deficiencies associated in the prior art. More particularly, the present invention comprises a transparent hollow globe, a powder material disposed within the globe which adheres to the inner surface of the globe, a scribe disposed within the globe which can be used to draw upon the inner surface of the globe by scraping off the powder material, and controls for manipulating the scribe. The device can be used to form three-dimensional sketches and is primarily intended for use as a teaching aid and toy.

The three-dimensional drawing device of the present invention permits a true representation of images such as the surface of the earth which may only be represented properly when drawn upon a sphere. This provides both an excellent teaching aid and a fascinating toy.

The three-dimensional drawing device may be used to teach subjects such as geography or astronomy, both of which are oriented toward spherical surfaces. To teach geography, the student could be requested to sketch the continents upon the surface of the three-dimensional drawing device and then sketch and label the countries located upon each continent. To teach astronomy, the stars and constellations of the celestial sphere could be sketched upon the globe of the three-dimensional drawing device to help students learn the relative positions of celestial bodies.

Artistic sketches can be produced by the three-dimensional drawing device, providing children with a means of entertaining themselves while expressing their artistic abilities. Many possibilities exist for truly innovative and artistic applications. For instance, the globe could be sketched upon to reproduce the appearance of such items as a baseball, a light bulb, a golf ball, the moon, or even the popular happy face having two round eyes and a smiling mouth. Purely fanciful or abstract images can easily be formed. The images are limited only by the user's imagination.

These, as well as other advantages will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of the three-dimensional drawing device of the present invention;

FIG. 2 is a perspective view of the scribe assembly and scribe support structure of the three-dimensional drawing device of the present invention;

FIG. 3 is a perspective view of the controls and positioning mechanism of the three-dimensional drawing device of the present invention;

FIG. 4 is a cross-sectional view of the scribe assembly; and

FIG. 5 is a cross-sectional view of the three-dimensional drawing device of the present invention.

DETAILED DESCRIPTION OF THE PREFERRED EMBODIMENT

The three-dimensional drawing device of the present invention is illustrated in FIGS. 1-5 which depict a presently preferred embodiment of the invention.

Referring now to FIG. 1, the three-dimensional drawing device has a housing, referred to generally as 10, upon which is rotatably mounted a transparent hollow globe 12 preferably made of a plastic, such as clear acrylic. The globe 12 contains a powder material, such as aluminum oxide, which adheres to the inner surface of the globe 12 and appears from the outside as a shiny silver surface. Also disposed within the globe 12 is a scribe assembly 40 which positions a scribe 42 to selectively remove the powder material from the inner surface of the globe 12, thereby permitting the user to sketch image upon the globe 12.

Thus, the globe 12 is a substantially transparent hollow three-dimensional drawing surface which extends approximately 360 degrees in azimuth and approximately 360 degrees in altitude. That is, on a horizontal axis, i.e. the equator of the globe, the drawing surface extends 360 degrees, i.e. a complete circle. Additionally, the drawing surface extends substantially from the bottom or south pole position through the top or north pole position back to approximately the bottom or south pole position, or approximately 360 degrees in altitude.

A first or azimuth control 14 causes the globe 12 to rotate about its vertical axis such that the scribe assembly 40 will draw a horizontal line across the surface of the globe 12. Rotating the azimuth control knob 14 several turns in one direction will cause the globe 12 to rotate one full turn about its vertical axis, thereby drawing a complete circle around the globe resembling a single line of latitude about the earth's surface.

A second or altitude control knob 16 causes the scribe assembly 40 to move up or down such that it defines a vertical line. The altitude knob 16 cannot be rotated a full turn in either direction since drawing upon the lower-most surface of the globe is not possible. Rotating the altitude control 16 from one extreme to the other draws a line from the bottom of the globe 12 to the top and back down the opposite side to the bottom, resembling a meridian or line of longitude upon the earth's surface.

A scribe retractor control 18 permits the user to move the scribe 42 along its longitudinal axis back into the scribe assembly 40, thereby permitting repositioning of the scribe assembly 40 with the scribe controls 14 and 16 without drawing upon the globe 12.

Scales 20, 22, and 24, index marks 26 and 28, and pointer 30 permit the positions of the scribe 42 to be recorded and also allow the user to use prerecorded positioning instructions to reproduce images upon the globe 12. Scale 22 and index 28 provide an indication of the altitude of the scribe 42. Scale 20 and index 26 provide an indication of the azimuth of the scribe 42. Scale 24 and pointer 30 also provide an indication of the azimuth of the scribe 42. Either scale 20 and index 26 or scale 24 and pointer 30 can be used in the three-dimensional drawing device to indicate azimuth.

Referring now to FIGS. 2 and 3, the control mechanism of the three-dimensional drawing device is illustrated. The control mechanism comprises a first or azimuth control knob 14, a second or altitude control knob 16, a first or azimuth pulley 72, a second or altitude control pulley 70, a first or azimuth control cable 56, a second or altitude control cable 58, a globe pulley 74, and a scribe pulley 48.

The scribe assembly 40 is rotatable about a horizontal axis which is perpendicular to the longitudinal axis of the scribe 42. The scribe assembly 40 comprises a scribe 42 having a pointed tip 44 which is retractable into a sleeve 46 formed onto the scribe pulley 48. The scribe pulley 48 has first 50 and second 52 axles which are rotatably supported by mount members 110 and 112 of support column 54. Groove 49 receives the second or altitude control cable 58 by which the altitude control knob 16 positions the scribe assembly 40 in altitude.

A bore 53 in the second axle 52 of the scribe assembly 40 forms a passageway through which a third or scribe retractor cable 60 passes. Applying tension to retractor cable 60 causes the scribe 42 to which retractor cable 60 is attached to retract into the sleeve 46. Retractor cable 60 extends from the opening of bore 53 through a slot 116 in support column 54 to first retractor pulley 66. From the first retractor pulley 66 the retractor cable 60 extends to second retractor pulley 68 and then to the scribe retractor control 18.

The support column 54 has a base 78 which attaches the support column 54 to the floor 38 of the housing 10. The upper surface 80 of the base 78 forms a smooth bearing surface. Apertures 106, 108, and 118 form passages through which control cables 60 and 58 pass. The base 78 is fixed to the floor 38 of the housing 10. Intermediate pulleys 62, 64, and first retractor 66 are rotatably attached to the floor 38 of the housing 10.

The azimuth control knob 14, having indicating indicia or scale 20 formed thereupon, is connected to the azimuth control pulley 72 by shaft 102. The azimuth control cable 56 extends between azimuth control pulley 72 and the azimuth globe pulley 74. The neck 76 of azimuth globe pulley 74 forms an attachment point for the globe 12 of FIG. 1. The globe 12 frictionally engages the neck 76 of the azimuth globe pulley 74 and may be further secured thereto with a suitable adhesive. Therefore, rotation of the azimuth control 14 causes a similar though lesser rotation of the globe 12. The exact amount of rotation is determined by the ratio of the diameter of the azimuth control pulley 72 to the diameter of the globe pulley 74.

The altitude control knob 16, having indicating indicia or scale 22 formed thereupon, is attached to the altitude control pulley 70 by shaft 104. The altitude control cable 58 extends from altitude control pulley 70 to first and second intermediate altitude pulleys 62 and 64, respectively, and on to the scribe holder pulley 48. Rotation of the altitude control knob 16 causes a similar rotation of the scribe assembly 40 about the longitudinal axis of its first and second axles 50 and 52. The precise amount of rotation of the scribe assembly 40 depends upon the ratio of the diameter of the altitude control pulley 70 to the diameter of the scribe holder pulley 48.

Referring now to FIG. 4, the scribe assembly 40 is shown in cross-section. The scribe 42 has a tip 44 which can contact the inner surface 86 of the globe 12 to form images thereupon by scraping a powder material therefrom. The images thus formed are visible upon the outer surface 88 of the globe 12.

A spring 84 biases the scribe 42 in its extended position. The spring 84 is seated upon a spring stop 80 which is attached to or may be formed as an integral part of the scribe 42. Applying sufficient tension to the retractor cable 60 to compress the spring 84 causes the scribe 82 to retract into the sleeve 46 of the scribe assembly 40. The spring 84 then urges the spring stop 80 and scribe 42 back toward the extended position.

The scribe retractor control 18 is attached to the scribe retractor cable 60 which passes over first and second intermediate pulleys 66 and 68, respectively, and then through the central opening 100 of the globe pulley 74 and into the bore 53 of the scribe assembly second axle 52. Pulling the retractor control 18 upward away from the upper surface 34 of the housing 10 places tension upon the retractor cable 60, thereby causing the scribe 42 to retract into the sleeve 46 of the scribe assembly 40. The retractor control 18 will be frictionally held in position by the upper surface 34 of the housing 10 through which it passes. Pressing the retractor control 18 downward into the housing 10 releases tension upon the retractor cable 60, thereby permitting the spring 84 to urge the scribe 42 out from the sleeve 46 of the scribe assembly 40.

Referring now to FIG. 5, the three-dimensional drawing device is depicted in cross-section. Raised bosses 120, 122, and 124 receive shafts 104 and 105. Similar raised bosses, not shown, receive shaft 102. Mounts 96 and 98 receive axles 94 and 114 for first and second retractor pulleys 66 and 68, thereby securing first and second retractor pulleys 66 and 68 to the floor 38 of the housing 10. First and second intermediate altitude pulleys 62 and 64 are similarly attached to the floor 38 of the housing 34.

The globe pulley 74 rotatably rests upon the bearing surface 80 of the base 78 of the support column 54. The central opening 100 in the globe pulley 74 receives the support column 54. The globe pulley is free to rotate about the support column 54 when azimuth control knob 14 is turned.

A fine powder material, such as aluminum oxide, is disposed within the globe 12. This fine powder material adheres to the inner surface 86 of the globe 12 thereby forming an opaque layer upon the inner surface 86 of the globe 12. This powder material is scraped off of the inner surface 86 of the globe 12 by the point 44 of the scribe 42 as the controls 14 and 16 are manipulated to move the scribe assembly 40.

The housing 10, which comprises the upper surface 34, sides 36, and floor 38 can be fabricated by the injection molding of plastic, as can the smaller parts, such as knobs 14 and 16, pulleys 62, 64, 66, 68, 70, 72, and 74, retractor control 18, and scribe assembly 40. The azimuth cable 56 and the altitude cable 58 should be made of a durable elastic material, such as rubber. The scribe retraction cable 60 should be made of a non-elastic material, such as nylon monofilament.

The operation of the three-dimensional drawing device is as follows. First the user inverts the three-dimensional drawing device and shakes it moderately to assure that an even layer of powder material is distributed upon the inner surface 86 of the globe 12.

The scribe 42 should be retracted prior to beginning a sketch. Alternatively, the scribe 42 could be positioned at the point where the sketch is to begin. Sketching is performed by rotating the azimuth 14 and altitude 16 control knobs to form the desired image. The scribe retractor 18 is pulled up away from the housing 34 any time it is necessary to reposition the scribe 42 without drawing upon the inner surface 86 of the globe 12.

For example, to draw a horizontal line about the outer-most perimeter of the globe 12, resembling the equator of the earth, proceed as follows:

First place the scribe at any position along the outer perimeter of the globe where the image is to be formed. Next invert the globe and shake it moderately to distribute an even coat of the powder material upon the inner surface 86 of the globe 12.

Place the three-dimensional drawing device upright on a flat surface in front of the user and rotate the azimuth control knob 14 several rotations in one direction until the scribe has made one complete rotation about the inner surface 86 of the globe 12. A line resembling the equator of the earth will then be drawn upon the outer-most perimeter of the globe 12.

To draw a second line above and parallel to the first line, resembling a line of latitude about the earth's surface, begin by pulling the scribe retractor 18 out, away from the housing 34. Reposition the scribe 42 a short distance, approximately one inch, above the previously drawn line. Push the scribe retractor 18 downward into the housing 34. Rotate the azimuth control 14 several revolutions in one direction to cause the scribe 42 to make one complete revolution about the globe 12. Note that the globe 12 itself rotates, not the scribe 42. Invert the three-dimensional drawing device and shake it moderately to erase.

A square may be drawn upon the surface of the globe 12 by placing the scribe halfway between the top and bottom and rotating the azimuth control 14 clockwise to form the base of the square. Next, rotate the altitude control 16 clockwise to form the right side of the square. Then rotate the azimuth control 14 counterclockwise to form the upper side of the square. Finally, rotate the altitude control 16 counter-clockwise to form the remaining vertical side of the square.

Drawing a circle upon the surface of the globe 12 is accomplished in a manner very similar to drawing the square, however, the azimuth control 14 and altitude control 16 must be manipulated simultaneously such that the scribe 42 travels in a series of arcs, thereby rounding off the corners of the square that would be formed by the independent manipulation of the control knobs 14 and 16.

A list of control positions can be provided to enable the user to reproduce a desired image upon the globe 12. For instance, the instructions to draw the square as given above may be more precisely listed as follows:
 (1) Begin with the scribe approximately midway between the top and bottom of the globe, and both controls reading "0".
 (2) Rotate the left (azimuth) control clockwise to "10".
 (3) Rotate the right (altitude) control clockwise to "10".
 (4) Rotate the left (azimuth) control counter clockwise to "0".

(5) Rotate the right (altitude) control counter clockwise to "0".

By following these instructions the image of a square is formed upon the globe 12. Similar instruction could be provided to form various images. The scale readings could also be recorded during the original generation of the image to provide instructions for its re-creation.

It is understood that the exemplary three-dimensional drawing device described herein and shown in the drawings represents only a presently preferred embodiment of the invention. Indeed, various modifications and additions may be made to such embodiment without departing from the spirit and scope of the invention. For example, the size and shape of the housing can be varied substantially without affecting the essential structure or operation of the invention. Also, various materials other than aluminum oxide may be used to coat the inside of the globe so that images may be formed thereon. Thus, these and other modifications and additions may be obvious to those skilled in the art and may be implemented to adapt the present invention for use in a variety of different applications.

What is claimed is:

1. A three-dimensional drawing device comprising:
   (a) a substantially transparent hollow three-dimensional drawing surface extending approximately 360° in altitude;
   (b) a powder material disposed within said three-dimensional drawing surface, said powder material adhering to the inner surface of said three-dimensional drawing surface when it comes into contact therewith;
   (c) a powder removal means disposed within said three-dimensional drawing surface for selectively removing said powder material therefrom to form images thereon;
   (d) control means for positioning said powder removal means upon said three-dimensional drawing surface, said control means comprising:
      (i) means for positioning said powder removal means in azimuth comprising a first control knob for positioning said powder removal means relative to said three-dimensional drawing surface in azimuth by rotating said three-dimensional drawing surface about its vertical axis; and
      (ii) means for positioning said powder removal means in altitude comprising a second control knob for positioning said powder removal means relative to said three-dimensional drawing surface in altitude by rotating said powder removal means about a horizontal axis which is perpendicular to a longitudinal axis of said powder removal means.

2. The three-dimensional drawing device as recited in claim 1 wherein said control means further comprises a powder removal means retractor control for removing the powder removal means from the inner surface of said three-dimensional drawing surface to permit repositioning of said powder removal means.

3. The three-dimensional drawing device as recited in claim 2 wherein said powder removal means comprises a scribe.

4. The three-dimensional drawing device as recited in claim 3 wherein said three-dimensional drawing surface comprises a globe.

* * * * *